United States Patent [19]

Daubenspeck et al.

[11] Patent Number: 4,595,986
[45] Date of Patent: Jun. 17, 1986

[54] METHOD FOR CONTROL OF AUTOMATIC MECHANICAL TRANSMISSION SYSTEM UTILIZING A MICROPROCESSOR BASED ELECTRONIC CONTROLLER

[75] Inventors: Ronald E. Daubenspeck, Indianapolis, Ind.; Robert R. Smyth, Bloomfield Hills; Donald Speranza, Canton, both of Mich.

[73] Assignee: Eaton Corporation, Cleveland, Ohio

[21] Appl. No.: 659,114

[22] Filed: Oct. 9, 1984

[51] Int. Cl.$^4$ .............................................. B60K 41/00
[52] U.S. Cl. ..................................... 364/424.1; 74/866
[58] Field of Search ............... 364/424.1; 74/856, 857, 74/859, 860, 865, 866

[56] References Cited

U.S. PATENT DOCUMENTS

| | | | |
|---|---|---|---|
| 4,115,671 | 9/1978 | Iijima | 74/866 |
| 4,353,272 | 10/1982 | Schneider et al. | 74/866 |
| 4,361,060 | 11/1982 | Smyth | 74/866 |
| 4,527,447 | 7/1985 | Richards | 74/866 |

FOREIGN PATENT DOCUMENTS 2813679 10/1978 Fed. Rep. of Germany ........ 74/857
2033981 5/1980 United Kingdom .................. 74/866

*Primary Examiner*—Parshotam S. Lall
*Attorney, Agent, or Firm*—C. H. Grace; H. D. Gordon

[57] ABSTRACT

A method for controlling an automatic mechanical transmission system (2) of the type comprising a throttling control device (19) controlled heat engine (12) a nonpositive coupling such as a friction master clutch (14) and a jaw clutch type multispeed mechanical transmission (10) utilizing a digital microprocessor (100) based electronic controller (30) is provided. The method includes providing logic routines for the microprocessor including a high priority algorithm for processing current inputs to determine current system status and to generate outputs including command outputs based upon current system status and a low priority algorithm for providing a signal indicative of the currently desired gear ratio to the high priority algorithm. The logic routines perform the low priority algorithm on a continuous loop basis and interrupting the low priority algorithm to perform the high priority algorithm at least twice during a critical control period corresponding to the time required for the system actuators to respond to a command output.

14 Claims, 4 Drawing Figures

METHOD FOR CONTROL OF AUTOMATIC MECHANICAL TRANSMISSION SYSTEM UTILIZING A MICROPROCESSOR BASED ELECTRONIC CONTROLLER

BACKGROUND OF THE INVENTION

1. Field of the Invention

This invention relates to a method for controlling automatic transmission systems of the type including automatic power transmissions providing a plurality of gear reduction ratios, such as automatic mechanical transmissions, throttle controlled engines and coupling devices interposed the engine and transmission such as fluid couplings (i.e. torque convertors) and/or friction master clutches. In particular, the present invention relates to control system methods for vehicles with throttle controlled engines and automatic transmissions wherein gear selection and shift decisions are made and executed based upon measured and/or calculated parameters such as output shaft or vehicle speed, input shaft or engine speed, throttle position, and the like. More particularly, the present invention relates to automatic transmission control system methods of the type described above wherein digital microprocessor based electronic control units are utilized to control the system.

2. Description of the Prior Art

Automatic transmissions of both the automatic mechanical type utilizing positive clutches and of the planetary gear type utilizing frictional clutches are well known in the prior art, as are control systems therefor. Electronic control systems for automatic transmissions wherein gear selection and shift decisions are made based upon certain measured and/or calculated parameters such as vehicle speed, engine speed, rate of change of vehicle speed, rate of change of engine speed, throttle position, rate of change of throttle position, full depression of the throttle (i.e. "kickdown"), actuation of the braking mechanism, currently engaged gear ratio, and the like are known in the prior art. Examples of such automatic transmission control systems for vehicles may be seen by reference to U.S. Pat. Nos. 4,361,060; 4,073,203; 4,079,638; 4,140,031; 4,324,322; 4,253,348; 4,038,889; 4,226,295; 3,776,048; 4,208,929; 4,039,061; 3,974,720 and 3,942,393, the disclosures of which are all hereby incorporated by reference.

The prior art controls for automatic transmissions were usually electric or pneumatic analog devices and-/or utilized a sequential or timing control philosophy whereby the individual operations and/or sub-operations required to perform a selected task were performed in accordance with a set sequence and/or set timing after the task was initiated and not on the basis of continuously updated command signals processed from current input signals.

SUMMARY OF THE INVENTION

In accordance with the present invention, the drawbacks of the prior art have been overcome or minimized by providing a method of controlling an automatic mechanical transmission system utilizing a digital microprocessor based electronic controller or central processing unit ("CPU") and based upon the control philosophy that sufficient current input information is provided and processed with sufficient frequency so as to allow the control of the vehicle drive line to be based upon an effectively instantaneously currently updated determination of the status of the drive line and that the time required to execute all of the critical control algorithms and to generate command output signals be relatively short compared to the mechanical response times of the system. The control of the drive line is based upon the actual status thereof which, is constantly substantially instantaneously updated and is compared with the desired status for the existing conditions. When discrepancies exist, usually corresponding to error signals, control action is initiated. With the exception of the gear selection procedures to be described below, an attempt is made to base the status determination and consequential control actions entirely on current input information, avoiding, where possible, interpretations or actions based upon "remembered" information.

The above is accomplished by constantly processing input signals to determine the status of various vehicle driveline components with a frequency providing updates of the status of the monitored component in a shorter period of time than required for that monitored component to effect other than a nominal change to the driveline.

This approach has two significant consequences. First, a major electronic disruption, including temporary loss of power, does not leave the system paralyzed or forced to recycle to "find itself". As soon as a disruption terminates, the control determines actual status and provides proper control action, including cancelling improper commands which may have been issued during the disruption. Since the control algorithm processing time is short compared to the mechanical response time, the true status can normally be reevaluated without impact on the vehicle operation.

Secondly, there is no built in or timed sequence of events for the various procedures. Actions occur as a consequence of status changes which fulfil prerequisite conditions for control operations. While typical sequences will emerge as a consequence of the fact that events tend to follow a typical pattern, if special circumstances do arise, the control system can manage without the necessity of a predesignated sequence.

The above is achieved by determining the most critical control requirements of the system (such as control of the throttle device, input shaft brake and modulated clutch engagement) and less critical control requirements of the system (such as actual selection of the most desired ratio which, due to the relatively large inertia of the vehicle, will have a relatively slow impact on the speed of the engine). By way of example, allowing the transmission to remain in the currently engaged gear ratio for a relatively long control period (such as 100-150 milliseconds) will result in a relatively small inconsequential change in the speed of the vehicle engine. The processing of command outputs to meet the most critical control requirements are processed by a high priority algorithm which is executed on a timed basis to provide the frequency of control desired for acceptable system control while the other less critical data processing requirements, such as selection of the desired gear ratio, are processed by a low priority algorithm which is continuously looped but is interrupted by the high priority algorithm.

The microprocessor is selected to provide a speed and resolution required to achieve the desired control. Preferably, the microprocessor is selected to have sufficient speed to execute the high priority algorithm at least twice during the period of time required for the mechanical actuators controlled by the command outputs processed by the high priority algorithm to respond to the command outputs to assure that a single error or interruption in the processing of input information will not effect the proper control of the automatic mechanical transmission system.

Accordingly, it is an object of the present invention to provide a new and improved automatic mechanical transmission control system method utilizing a digital microprocessor based electronic control unit.

This and other objects and advantages of the present invention will become apparent from a reading of the description of the preferred embodiment taken in connection with the attached drawings.

DESCRIPTION OF THE PREFERRED EMBODIMENT

The term "automatic mechanical transmission system" as used herein shall mean a system for a vehicle comprising at least a throttle device controlled heat engine, a multi-speed jaw clutch type change gear transmission, a nonpositive coupling device such as a master friction clutch and/or a fluid coupling (i.e. a torque convertor) interposed the engine and the transmission and a control unit for automaticaly controlling same. The system may also include an input shaft or engine brake and/or other power synchronizing devices.

Figure 1:
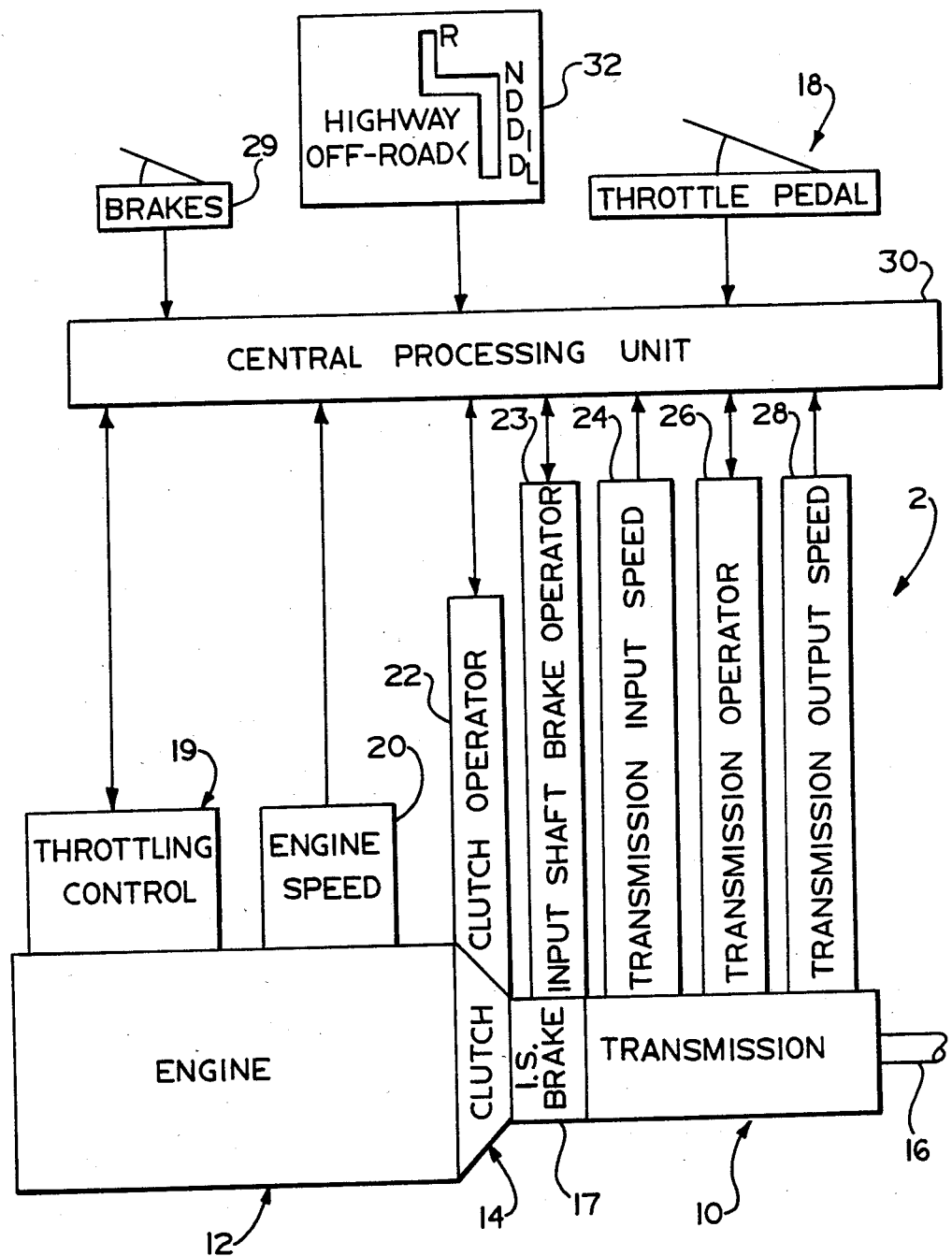
FIG. 1 is a schematic illustration of the components and interconnections of the automatic mechanical transmission system of the present invention.

FIG. 1 schematically illustrates an automatic mechanical transmission system 2 comprising an automatic multi-speed change gear transmission 10 driven by a throttle device controlled engine 12, such as a well known diesel engine, through a friction master clutch 14. The output of the automatic transmission 10 is output shaft 16, which is adapted for driving connection to an appropriate vehicle component such as the differential of a drive axle, a transfer case or the like as is well known in the prior art. Preferably, to control the speeds of the input shaft of the transmission for sychronizing purposes, an input shaft brake 17 is also utilized.

As is known in the prior art, but not illustrated, a fluid coupling (such as a torque convertor) may be substituted for and/or used in connection with master clutch 14. The fluid coupling may be provided with selectively engageable friction clutch means between the input and output elements thereof, which means are actuated by an operator similar to clutch operator 22.

The above-mentioned power train components are acted upon and monitored by several devices each of which will be discussed in greater detail below. These devices include a throttle position or throttle opening monitor assembly 18 which senses the position of the operator controlled vehicle throttle pedal or other fuel throttling device, a throttle control 19 which controls the supply of fuel to the engine, an engine speed sensor 20 which senses the rotational speed of the engine, a clutch operator 22 which engages and disengages clutch 14, an input shaft brake operator 23, a transmission input shaft speed sensor 24, a transmission operator 26 which is effective to shift the transmission 10 into a selected gear ratio, a transmission output shaft speed sensor 28 and a brake application sensor 29.

The above-mentioned devices supply information to and/or accept commands from an electronic central processing unit 30. The central processing unit or controller 30 is based upon a digital microprocessor, the specific configuration and structure of which are described in greater detail below.

The central processing unit 30 also receives information from a shift control assembly 32 by which the operator may select a reverse (R), neutral (N) or several forward drive (D, $D_1$, $D_L$) modes of operation of the vehicle. Alternatively to providing selectable $D_1$ and $D_L$ positions, a separate on-highway/off-road selector switch may be provided. An electrical power source (not shown) and/or source of pressurized fluid (not shown) provides electrical and/or pneumatic power to the various sensing, operating and/or processing units. Drive train components and controls therefor of the type described above are known in the prior art and may be appreciated in greater detail by reference to above mentioned U.S. Pat. Nos. 3,776,048; 4,038,889; 4,226,295 and 4,361,060.

As is known, the central processing or control unit 30 receives direct inputs from sensor 18 indicating the present throttle position, from sensor 20 indicating the present engine speed, from sensor 24 indicating the present transmission input shaft speed, from sensor 28 indicating the present transmission output shaft speed, from sensor 29 indicating if the vehicle brakes are applied and from sensor 32 indicating the mode of operation selected by the vehicle operator or driver. In addition, sensors from the clutch operator 22, the input shaft operator 23 and/or the transmission operator 26 may provide input signals to controller 30. In addition to these direct inputs, the central processing unit 30 may be provided with circuitry and/or logic for differentiating the input signal from sensor 20 to provide a calculated signal indicative of the acceleration of the engine, means to compare the input signals from sensor 24 and 28 to calculate a current engaged gear ratio, circuit means to compare the current engaged gear ratio with the signal from sensor 28 to provide a calculated engine speed, means to sense full throttle, and means to calculate an expected engine speed in a given engaged ratio and at a given or sensed output shaft speed. The central processing unit also comprises a memory means for storing certain input and/or calculated information, such as the direction of the last shift, and means for clearing the memory means upon the occurrence of a predetermined event. Additionally, the central processing unit 30 may include one or more timing devices, or clocks, which may be reset upon the occurrence of a predetermined event to measure a predetermined time interval. Specific circuitry for providing the above mentioned functions is known in the prior art and an example thereof may be seen by reference to above mentioned U.S. Pat. No. 4,361,060.

It is understood that, given a known drive train, output shaft speed and vehicle speed are related in a known manner. Also, assuming a fully engaged master clutch 14 (or a locked up fluid coupling), input shaft speed and engine speed are equal and signals indicating any two of input shaft/engine speed, currently engaged gear ratio and output shaft/vehicle speed is sufficient to specify all three parameters.

Sensors 18, 20, 24, 28 and 29, and the sensors associated with operators 22, 23 and/or 26 may be of any known type or construction for generating analog or digital signals proportional to the parameter monitored thereby. Similarly, operators 22, 23 and 26 may be of any known electrical, pneumatic or electro-pneumatic type for executing operations in response to command signals from processing unit 30.

Clutch operator 22 is controlled by the central processing unit 30 and may engage and disengage master clutch 14 as described in U.S. Pat. No. 4,081,065, hereby incorporated by reference. Transmission 10 may include synchronizing means, such as an accelerator and/or a brake mechanism as described in U.S. Pat. No. 3,478,851, hereby incorporated by reference. The transmission 10 is preferably, but not necessarily, of the twin countershaft type as is seen in U.S. Pat. No. 3,105,395, hereby incorporated by reference.

A purpose of the central processing unit is to select, in accordance with a program (software and/or firmware) and current or stored parameters, the optimal gear ratio at which the transmission should be operating and if necessary to command a gear change, or shift, into the selected optimal gear ratio. Ideally, an electronically controlled transmission can be programmed to enhance specific vehicle characteristics, fuel economy or performance; however, enhancement of one characteristic (i.e., fuel economy) often leads to a degredation of other characteristics (i.e., performance). Furthermore, there are constraints which must be considered which limit the degree to which specific characteristics can be enhanced. Such constraints include the ensurance of safe operation of the vehicle and the minimization of nuisance shifts which lead to increased driver fatigue. No absolute standards are known to exist for most of these constraints.

Selection of the D (on-highway drive) mode on the shift selector 32 by the driver indicates to the central processing unit 30 that peak performance is not required. In this mode, the gear selection subsystem may select fifth (5th) gear as the starting gear and select subsequent shifts, both upshifts and downshifts, according to what are referred to as the on-highway shift profiles which are intended to enhance fuel economy.

Similarly, selection of the $D_1$ (drive 1) or $D_L$ (drive low) modes of the shift selector by the driver indicates to the central processing unit 30 the desire to operate at peak performance at the expense of fuel economy. While in the $D_1$ mode, the gear selection subsystem may consider third gear (3rd) as the starting gear, and first (1st) gear is selected as the starting gear while in the $D_L$ mode. Subsequent shifts, both upshifts and downshifts, are selected according to what are referred to as the off-road shift profiles which are intended to enhance vehicle performance.

The reverse mode or modes are preferably implemented by explicit driver selection via the shift selector. Automatic shifting between the reverse and forward drive modes is typically not required and not performed.

Figure 2:
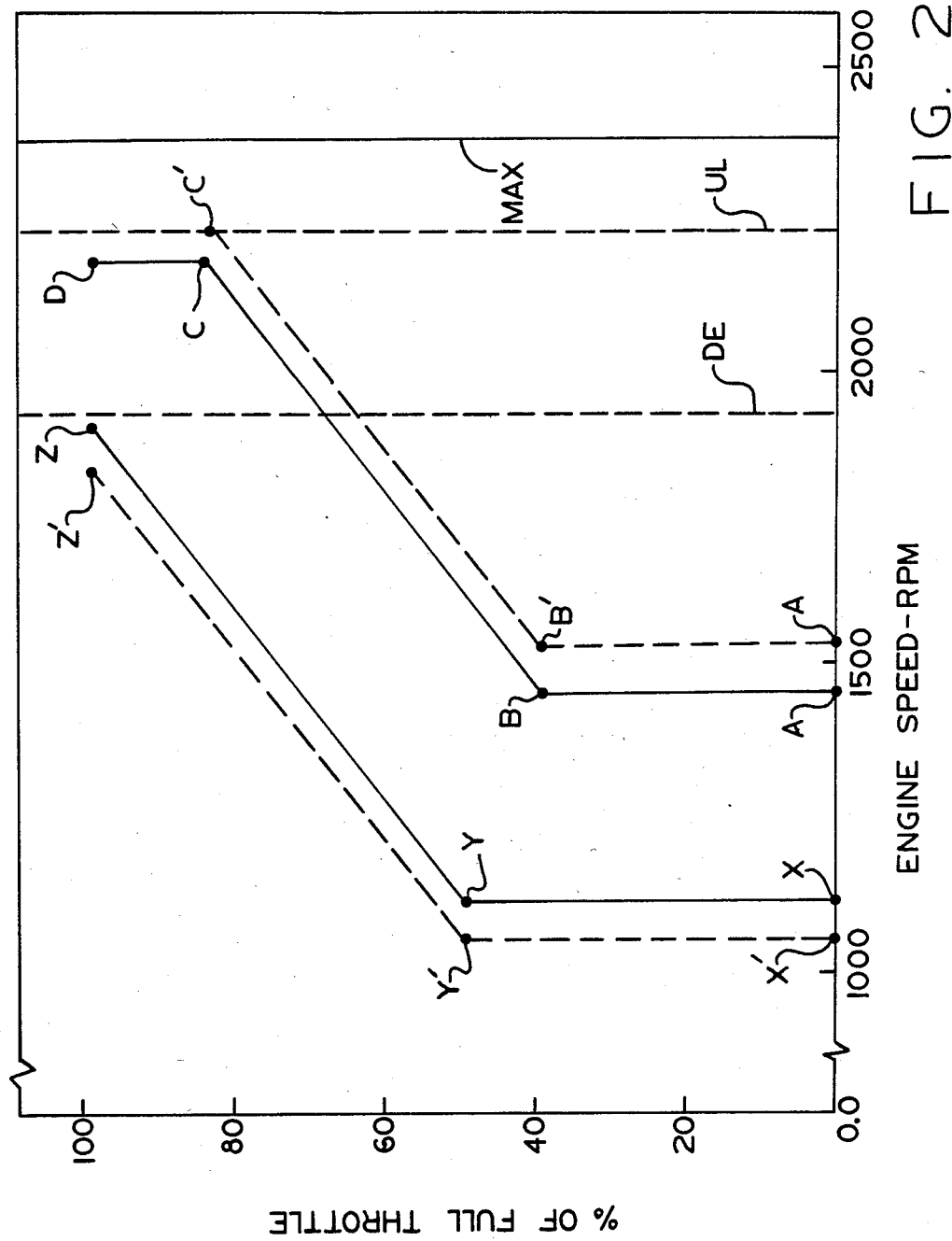
FIG. 2 is a graph of engine speed versus throttle position illustrating the shift patterns, or shift point profiles, utilized to select the desired gear ratio of the automatic mechanical transmission.

One of the primary purposes of the central processing unit program or logic rules is to generate shift patterns, or shift point profiles, as schematically represented in FIG. 2. The shift point profiles generated by the central processing unit will determine if the transmission should remain in the currently engaged gear ratio, should be upshifted to the next highest gear ratio or should be downshifted to the next lower gear ratio. The shift point profiles are determined by a predetermined program acting upon current or stored information and are usually selected to provide a compromise between operation at the most fuel efficient possible gear ratio and operation in a gear ratio to provide optimal performance characteristics of the vehicle. The shift point profiles graphically illustrated in FIG. 2 are a function of both throttle position, expressed as a percentage of maximum throttling position, and of engine speed. The engine speed may be directly sensed or, preferably, is calculated engine speed which will not vary during a shift transient as is known in the prior art.

The shift patterns may be generated by means of lookup table and/or calculation methods whereby the engine speed limits or profiles for upshifting and downshifting are generated for a sensed throttle position and then compared to the sensed or calculated current engine speed.

As used herein, a "lower gear ratio" or "lower drive ratio" will refer to a gear or drive ratio having a higher ratio of input shaft speed to output shaft speed. For example, ninth (9th) gear is lower than tenth (10th) gear and a shift from tenth gear to ninth gear is a downshift.

The on-highway (A-B-C-D and X-Y-Z) shift profiles provide the basis for shifting the transmission as a function of speed modulated by the driver controlled throttle postion. The sets of profiles are primarily derived from the characteristics of the engine including the effects of all engine driven auxiliaries.

The engine speed signal, shown in FIG. 2 in terms of engine RPM, is derived by multiplying the transmission output shaft signal by the numeric value of the gear ratio of the gear currently selected by the control electronics. The selection information, and thus the multiplication factor, is preferably updated immediately for each new selection without reference to the actual mechanical status, thus allowing new shifts to be initiated, if required, during a shift in response to continuing changes in output shaft speed. Throttle position is shown as a percentage of full (i.e. wide open) throttle from zero percent (0%) to one hundred percent (100%).

Referring to FIG. 2, the shift profile includes an on-highway upshift line A-B-C-D and an on-highway downshift line X-Y-Z. Briefly, for operating conditions within the space bounded by downshift line X-Y-Z and upshift line A-B-C-D no gear change is required, for operating conditions at or to the right of upshift line A-B-C-D an upshift to the next highest gear ratio is required and for operating conditions within the area at or to the left of downshift line X-Y-Z a downshift to the next lowest gear ratio is required. It is understood, of course, that a single shift point profile may be utilized for all gear ratios of a transmission or a separate shift profile may be generated for each currently engaged gear ratio. Generally, the greater the difference in ratio splits between the gears, the greater the desirability of separate shift point profiles for each current engaged gear ratio.

It is understood that other sensed or calculated monitored speeds, such as input shaft speed, output shaft speed, vehicle speed or the like may be substituted for engine speed in the shift point profiles illustrated in FIG. 2.

As the relative importance of fuel efficiency and vehicle performance varies under different operating conditions, the upshift and downshift lines are preferably not static but are dynamic. Dynamically moving shift lines are known, and are discussed in greater detail in U.S. Pat. No. 4,362,060. Typically, the shift lines are moved in response to current and/or stored information such as direction of last shift, acceleration of the vehicle, acceleration of the engine, rate of change of throttle position, operation of the vehicle brake or the like.

It is important to understand that the shift point profiles are dependent upon the throttle pedal position as determined by sensor 18 as well as the engine speed. Other than selecting a reverse, neutral or forward drive mode of operation of the vehicle by manipulation of selector 32, the operator's only, or at least primary, input to the transmission is his manipulation of the throttle pedal or other fuel control as the case may be. Accordingly, by setting shift profiles and modifying same in partial response to throttle pedal position the operator's desires are accounted for by the central processing unit when deciding the optimal gear ratio at which the transmission is to operate.

The actual amount of fuel supplied to the engine is controlled by throttling controlling device 19 acting upon a controlled device which may be a carborator, a fuel injector and fuel injection rack or the like.

A'-B'-C' is the upshift profile as dynamically adjusted after initiation of a downshift as explained in greater detail in above-mentioned U.S. Pat. No. 4,361,060. X'-Y'-Z' is the downshift profile as dynamically adjusted after initiation of an upshift as described in U.S. Pat. No. 4,361,060.

The shift point profiles also include an upshift limit (UL) at which the transmission must be upshifted to prevent impending speed related damage to the engine and a downshift enable limit (DE) above which the transmission must not be downshifted to prevent speed related damage to the engine. The upshift limit (UL) and downshift enable limit (DE) are not functions of throttle position.

Upshifts occur if the operating point moves to the right of the A-B-C or UL profiles. Downshifts occur if the operating point moves to the left of the DE and X-Y-Z profiles.

Figure 3:
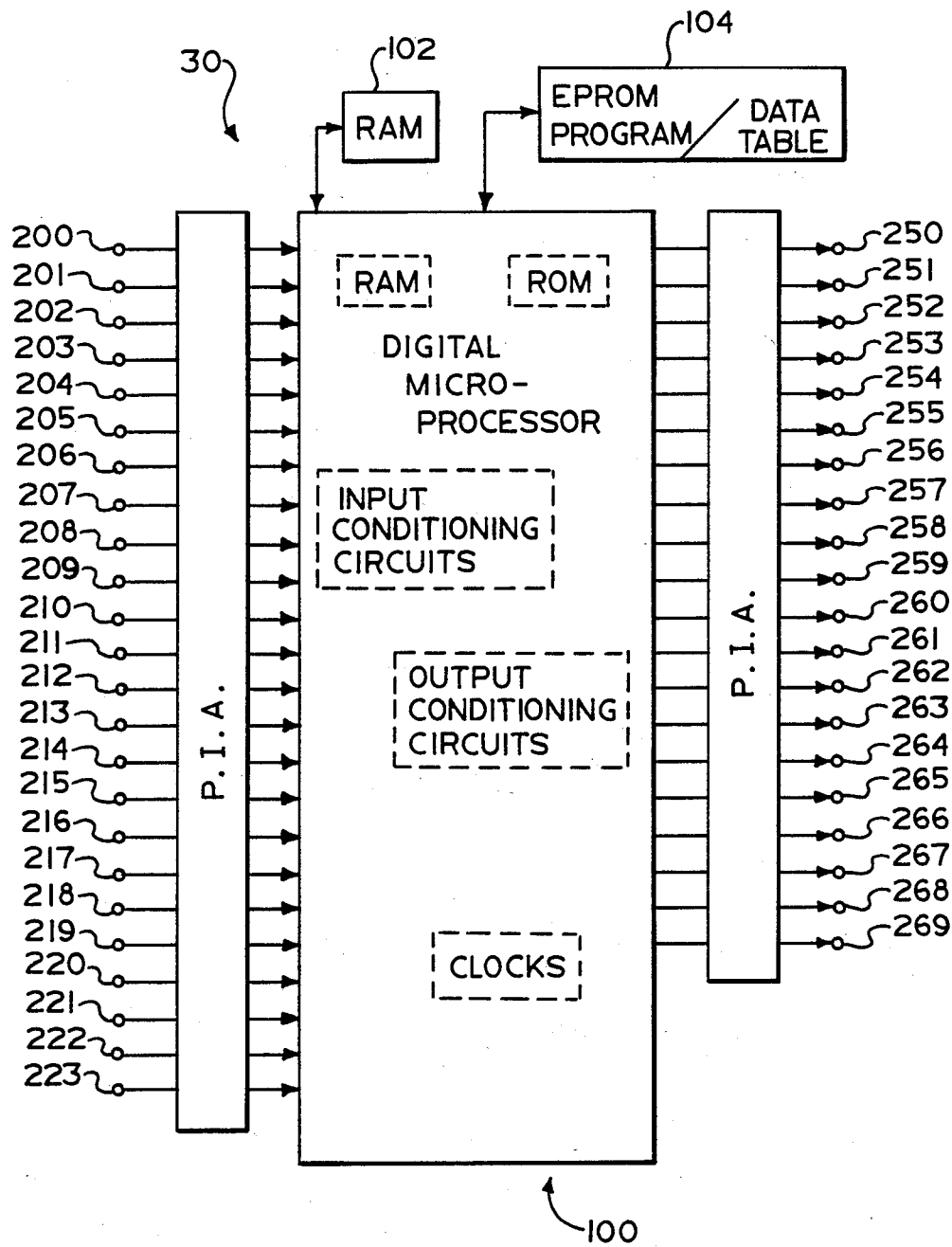
FIG. 3 is a schematic illustration of the digital microprocessor based electronic control unit of the present invention.
Figure 4:
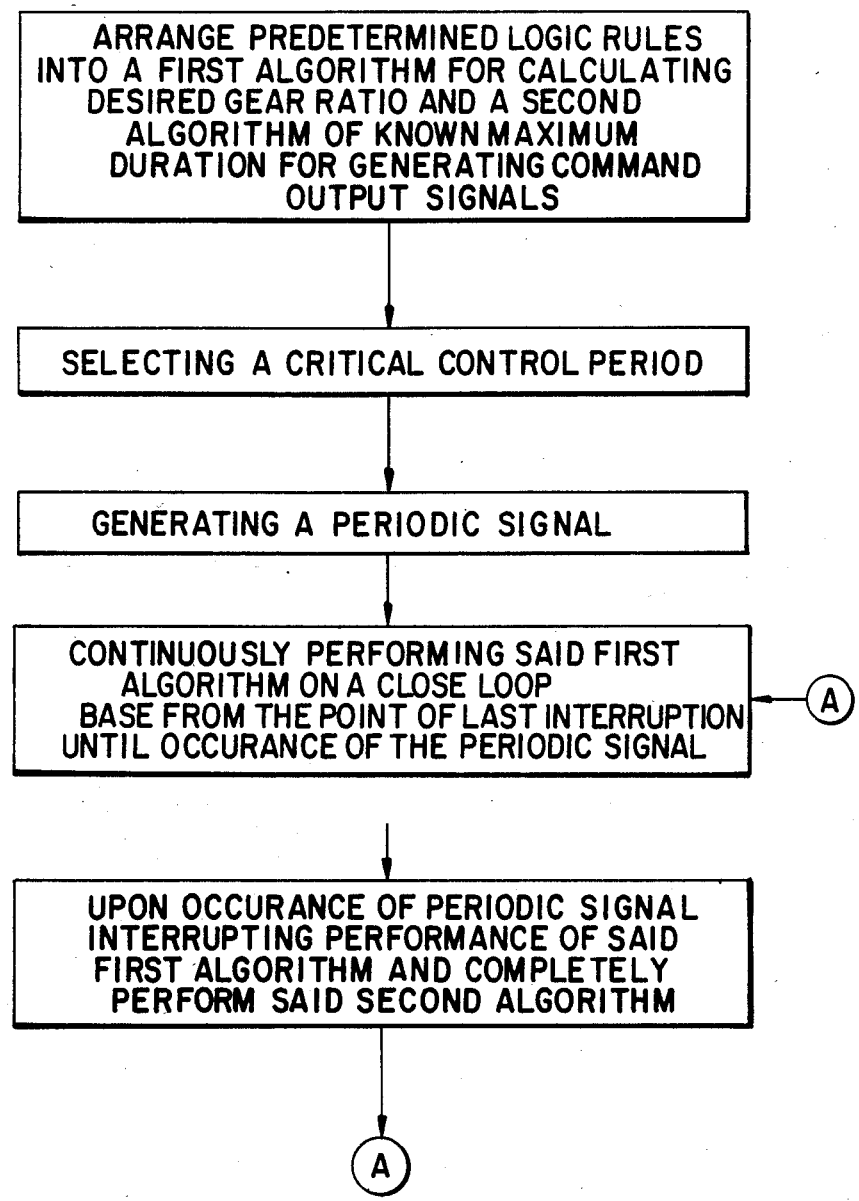
FIG. 4 is a symbolic illustration, in the form of a flow chart, illustrating the method of the present invention.

The electronic CPU or controller 30 is schematically illustrated in FIG. 3 and includes a digital electronic microprocessor 100. By way of example, the microprocessor 100 utilized in the present automatic mechanical transmission system controller 30 is a model 8097 micro controller, or chip, currently offered for sale by Intel Corporation of Santa Clara, Calif., U.S.A., and is well suited for the task of an automatic transmission control processor. Briefly, the microprocessor selected should have sufficient input and output connections and be of sufficient speed and resolution to meet the design requirements. As stated above, in selecting the microprocessor to be utilized, the design philosophy adopted was that the time required to execute all of the critical control algorithms be short compared to mechanical response times of the system so that occasional errors can be corrected without impact on vehicle operation and that all critical control command signals be processed constantly and with sufficient frequency from current input signals to be based on effectively instantaneously updated current system operating conditions. By way of example, in the system shown, the actuators are typically operated by solenoid controlled valves and require a minimum of about 20-30 milliseconds to cause movement. The critical control algorithm requires about 6-8 milliseconds to complete and is completed once every 10 milliseconds.

Additionally, the desired control accuracies will require a minimum resolution of the raw data. The Intel 8097 micro controller utilized is of a 16 bit (i.e. 16 bit per word) design which has been found to be sufficient for the control of the illustrated automatic mechanical transmission system. It is understood that other micro processors may be equally suited for the task of controlling an automatic mechanical transmission system and the specific model and structure of the micro processor selected, other than defined in the attached claims, forms no part of the present invention.

In addition to the power and other enabling inputs (not shown) the micro processor 100 of the present invention utilizes twenty four (24) input interfaces or connections, 200-223, and twenty (20) output connections (250-269).

In this particular example, the processor 100 interfaces with three magnetic speed sensors, 20, 24 and 28, producing frequency modulated signals, five analog input signals and 17 digital signals originating from existing vehicle switches, feedback switches and from the transmission 10 itself, and digitial inputs from the driver command counsel 32. On the output side, the processor controls 20 solenoids all of which are controlled in a simple on-off mode, except for one (the input shaft brake solenoid) whose required time resolution for control dictates that it be controlled by a high speed pulse output of the processor. Additionally, the controller issues one command signal in analog form to the throttle position regulator 19.

In addition to the microprocessor 100, the controller 30 may also include a random access memory (RAM) 102 and a read only memory (ROM), which may be an erasable programmable read only memory (EPROM) 104 in which is stored the program and the data or lookup table defining the various shift point profiles as illustrated in FIG. 2.

In addition to input signals from the speed sensors, the input signals may also include fuel pedal position input signal from the sensor 18, a throttle control position signal from throttle controlling operator and sensor 19, and ignition switch monitoring signals (monitors if the vehicle ignition is on or off) various input signals from the operator counsel 32, various status input signals from the clutch operator 22 and transmission operator 26, a signal indicating the brakes have been applied from sensor 29, and other signals which may be desireable for control of system 2. As is known, the digital inputs are interfaced to the microprocessor 100 by means of peripheral interface adapters and appropriate input conditioning circuitry.

The solenoid driving output signals and output signals 250-259 are interfaced through output conditioning circuitry and another peripheral interface adapter. About half of the 20 solenoid drivers are reserved for control of the transmission operator and the shift forks controlled thereby, nine of the remaining drivers are used to control an engine compression brake, a power takeoff drive, neutral start and main power relays and the main clutch 14. The input shaft brake 17 is controlled through a single driver connected with a high speed output which can be set and reset at specified times as will be described in greater detail below.

To control the automatic mechanical transmission system 2, the central processing unit 30 must generate output command signals at connectors 250-269 to the various operators. As will be described in greater detail below, all of the command outputs are generated by a high priority algorithm which processes the current inputs to determine current system status and generates the command outputs utilizing predetermined logic rules. A lower priority algorithm is utilized to calculate the desired gear ratio for existing system conditions and to provide a signal indicative of same to the high priority algorithm.

As the change in engine speed resulting from maintaining the vehicle in the currently engaged ratio, due to the relatively large inertia of the vehicle and of the transmission system 2, which will occur over a relatively long microprocessor data processing cycle, i.e. 50-100 milliseconds for example, is negligible, processing of the input information to determined the desired engaged gear ratio may be considered of a lower priority than processing of input signals to provide the output signals which control the throttle control operator, the clutch operator, the input shaft brake operator and the like.

In view of the above, and also in view of the control philosophy that the critical control algorithms be short compared to mechanical response times of the system and that sufficient information be provided so as to allow control of the drive line to be based upon the continuous determination of the status of the drive line, the logic rules by which the processor will process input data are structured to process the low priority algorithm by which the desired gear ratio is calculated, in this case by means of a lookup table, calculation and comparison method, on a continuous loop basis whereby the algorithm is performed from beginning to end and then immediately reinitiated. The high priority algorithm by which command outputs are generated from current input signals and certain stored information, including an input signal indicative of the desired gear ratio as processed by the low priority algorithm, is executed on a uniformly periodic basis whereby the low priority algorithm is interrupted, the high priority algorithm is performed and then the low priority algorithm is continued from the point of interruption thereof. The timing of initiation of the high priority algorithm is based upon the period of time required to complete same and the period of time required for the mechanical actuators to respond to the command output signals. The high priority algorithm is preferably initiated by a clock provided in the microprocessor 100 and is completed with a frequency sufficient to allow the high priority algorithm to be completed at least twice during the period of time required for the quickest mechanical actuator to respond to a command output signal.

The command outputs of the high priority algorithm are converted (modified and/or amplified) by the interface circuits and/or peripheral interface adapters ("drivers") to provide signals for controlling actuator solenoids and the like.

The low priority algorithm, in addition to processing the input information to determine the desired engaged gear ratio, may also be utilized to process input information to provide signals to the high priority algorithm for calibration of sensors and the like. In the low priority algorithm, the processed input information involves throttle position, engine speed, and may also include input signals indicative of direction of the last shift, input signals indicating if the transmission is to be operated in a manual or an automatically controlled mode, information indicative if the vehicle ignition as been actuated and various fault detecting information.

From a physical hardware sense, the automatic mechanical transmission system 2, may be considered as consisting of three principal interactive systems, the control of which are exercised by the high priority algorithm routines. These subsystems include the throttle control 19, the main or master clutch 14 and the transmission 10. Control of each of these three subsystems requires receipt of relevant actual and desired status information from both the low and high priority algorithm routines as well as from the physical devices themselves. The high priority control algorithm, based upon this information, determines the control mode of the subsystems to be employed.

The throttling control 19 has five modes of operation, start, predip, synchronize, recover and follow. The start mode of operation controls the throttle during the clutch engagement when the vehicle starts from rest. The predip mode is used to gradually decrease the throttle at a controlled rate. The synchronizing mode is used to bring the engine to the correct speed for the next gear to be engaged while the recovery mode is used to gradually bring the throttle back to the position demanded by the driver's foot pedal position as sensed by sensor 18. In the follow mode, the throttling control is utilized to supply fuel to the engine at the rate required by the throttle position indicated by the operator as read from sensor 18.

The clutch operator 22 has three unmodulated and three modulated modes of operation. The unmodulated modes are used to quickly disengage the clutch at the initiation of a shift, to quickly engage the clutch to the friction point or the fully engaged condition at the completion of a shift or for purposes of synchronization. The modulated modes of operation are usually utilized to control clutch engagement for start from rest operations and/or for smooth clutch engagements in the event of greater than a predetermined rotational speed difference between the input and output plates of the clutch.

The transmission control subsystem involves one of the principal features of the automated mechanical transmission which is the actual implementation of the shift by actively synchronizing the transmission under electronic control.

An important signal which is derived in the high priority algorithm routine represents the speed error between the selected gear and its matching jaw clutch. This is typically obtained by dividing the actual input shaft speed by the selected gear ratio and subtracting from it the actual output shaft speed (multiplied by the selected range ratio, which is 1:1 if a simple transmission is utilized). When the transmission is in the selected gear, this error signal is nominally zero.

Shift synchronization is inhibited until confirmation is received that the throttle control and clutch control subsections have successfully brought the system into a synchronizable condition. At this point, the rotational speed of the input shaft needs to be modified to bring it to a speed closely synchronized with the actual output shaft speed multiplied by the overall gear ratio of the desired new gear.

Typically, during a downshift, the speed of the input shaft needs to be increased. This is accomplished by engaging the clutch while the transmission is in neutral allowing the input shaft synchronization to be performed as a natural extension of the engine synchronization process. During an upshift, the speed of the input shaft typically needs to be reduced. This is accomplished through the control of the input shaft brake 17. As the response of the input shaft to application in the input shaft brake is relatively quick, to bring the input shaft to within a desired range (such as within 20 RPM of the true synchronous speed) as compared to the periodic performance of the high priority control algorithm and the mechanical actuators response thereto, the input shaft brake may be commanded to be released on the basis of an estimated time rather than on the basis of currently processed input signals. While this does depart from the basic control philosophy of the control unit 100, such departure has been found to be unavoidable and not to objectionably detract from the performance of the system.

A high priority algorithm will also perform various fault detection routines and adopt various correction actions in response thereto. With the exception of detection of a fault, the low priority algorithm routine for determining the desired engaged gear ratio will utilize the inputs current at the initiation thereof throughout the entire loop thereof.

Summarizing, determination of and generation of a signal to the high priority algorithm indicative of a desired gear ratio will be processed by the low priority algorithm. As a main purpose of transmission 10 is to control engine speed in view of vehicle speed, and as the relatively high inertia of the vehicle results in relatively small or negligable changes in engine speed during the time required to process a multitude of algorithm routines by microprocessor 100, updating the desired engaged gear ratio (i.e. deciding if a shift is required) is of a relatively low priority (not required on as frequent a basis) as compared to processing inputs to generate command outputs (solenoid driver signals) to control fuel supply, clutch engagement, fault detection and/or input shaft brake engagement. This is especially true as gear selection is usually performed by a relatively time consuming lookup table, multiple calculation and/or comparison method which, if included in the high priority algorithm, would undesireably increase the time required to perform same.

Although the present invention has been set forth with a certain degree of particularity, it is understood that various modifications are possible without departing from the spirit and scope of the invention as hereinafter claimed.

We claim:

1. An improved method of controlling a vehicle automatic mechanical transmission system comprising a throttling device controlled engine, and operator actuated throttle position indication device, a multi-speed jaw clutch type change gear transmission, a nonpositive coupling device drivingly interposed the engine and the transmission and actuators responsive to command signals for controlling the status of said throttling device, coupling device and transmission, said method including utilizing a digital microprocessor based electronic control unit for processing current and stored inputs in accordance with predetermined logic routines to determine desired engaged ratio of the transmission and to generate command outputs to said actuators, said control unit having means to receive inputs indicative of at least transmission input shaft speed, transmission output shaft speed, engine speed and operator actuated throttle position and means to condition and store said input information;

said improved method comprising the steps of:
selecting a critical control period based upon the rates of response of said throttling device, coupling device and transmission actuators and the frequency of adjusting said actuators required to assure the speed of said vehicle engine will not vary during said critical control period by greater than a predetermined nominal value;

arranging said predetermined logic routines into a first alogorithm routine and a second algorithm routine, said microprocessor in said first algorithm routine processing current inputs to provide a processed output signal indicative of the desired engaged ratio of the transmission, said microprocessor in said second algorithm routine processing said then current input signals, including said processed output signal, to generate output signals, including command output signals to said actuators, independently of previously processed input and generated output signals;

providing performance logic rules for said microprocessor wherein said microprocessor performs said first algorithm routine on a continuous loop basis and is responsive to a periodic signal to interrupt performance of said first algorithm routine to completely perform said second algorithm and then to resume performance of said first algorithm routine from the point of interruption;

generating said periodic signal at a frequency sufficient to cause at least two interruptions of said first algorithm and complete executions of said second algorithm during said critical control period.

2. The method of claim 1, wherein said first algorithm is interrupted at least three times during each complete loop thereof to perform said second algorithm.

3. The method of claim 1, wherein said periodic signal is generated at least three times during each critical control period.

4. The method of claim 3, wherein said critical control period is shorter than the time required for any of said actuators to change the status of the device controlled thereby.

5. The method of claim 4 wherein said second algorithm also processes current input signals to generate output signals indicative of detection of a fault in the system.

6. The method of claim 1, wherein said first algorithm is interrupted at least twice during each complete loop thereof to perform said second algorithm.

7. The method of claim 6, wherein said nonpositive coupling is a master friction clutch.

8. The method of claim 6 wherein said second algorithm also processes current input signals to generate output signals indicative of detection of a fault in the system.

9. The method of claim 6, wherein said critical control period is shorter than the time required for any of said actuators to change the status of the device controlled thereby.

10. The method of claim 9, wherein said processer includes clock means for generating said periodic signal.

11. The method of claim 10, wherein said nonpositive coupling is a master friction clutch.

12. The method of claim 6, wherein said first algorithm processes the inputs current at the beginning of each loop thereof to determine the desired engaged gear ratio.

13. The method of claim 12, wherein said first algorithm comprises lookup table and calculation subroutines.

14. The method of claim 13, wherein said inputs included a stored signal indicative of the direction of the last shift.

* * * * *